United States Patent
Waite et al.

(10) Patent No.: US 7,797,152 B1
(45) Date of Patent: Sep. 14, 2010

(54) METHOD OF DATABASE SEARCHING

(75) Inventors: David P. Waite, Silver Spring, MD (US); Richard O. Wyckoff, Woodstock, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 723 days.

(21) Appl. No.: 11/363,299

(22) Filed: Feb. 17, 2006

(51) Int. Cl.
*G06F 17/27* (2006.01)

(52) U.S. Cl. ............... 704/9; 704/10; 707/3; 707/6; 382/187; 382/228

(58) Field of Classification Search .......... 704/9, 704/10; 707/3, 6; 382/187, 228
See application file for complete search history.

(56) References Cited

U.S. PATENT DOCUMENTS

| 5,392,363 | A | * | 2/1995 | Fujisaki et al. ......... 382/187 |
| 5,768,423 | A | * | 6/1998 | Aref et al. ............ 382/228 |
| 5,835,888 | A | * | 11/1998 | Kanevsky et al. ........ 704/9 |
| 6,018,708 | A | | 1/2000 | Dahan et al. |
| 6,182,039 | B1 | | 1/2001 | Rigazio et al. |
| 6,415,250 | B1 | * | 7/2002 | van den Akker .......... 704/9 |
| 6,557,004 | B1 | | 4/2003 | Ben-Shachar et al. |
| 6,662,180 | B1 | * | 12/2003 | Aref et al. ........... 707/6 |
| 7,043,494 | B1 | * | 5/2006 | Joshi et al. .......... 707/101 |
| 2002/0002550 | A1 | * | 1/2002 | Berman ............... 707/3 |
| 2004/0107089 | A1 | * | 6/2004 | Gross et al. .......... 704/10 |
| 2005/0108001 | A1 | * | 5/2005 | Aarskog ............. 704/10 |

* cited by examiner

*Primary Examiner*—Richemond Dorvil
*Assistant Examiner*—Michael C Colucci
(74) *Attorney, Agent, or Firm*—Jennifer P. Ferragut; Robert D. Morelli

(57) ABSTRACT

The present invention is a method of database searching. First, a language is selected and elements received. The system is searched to identify a unit number associated with each element, which is linked to a data unit containing morphological variants of the element. If none are identified, the element is broken into sub-textual units that may contain a prefix, compound-prefix, and/or suffix along with a primary element. A unit number is then obtained for the primary element. If this does not result in a match, the elements may be saved in a database for further linguistic development. A unit number associated with each matched element is then chosen, and the elements contained in the data units linked to the unit numbers are compared to a database index. If an element is associated with multiple unit numbers, this process is repeated until all data units have been compared to the database.

13 Claims, 3 Drawing Sheets

METHOD OF DATABASE SEARCHING

FIELD OF THE INVENTION

This invention relates to linguistics and, more specifically, to natural language processing.

BACKGROUND OF THE INVENTION

In the field of text processing and database searches, an increasing problem has become the need to cross reference indexes using combined phrases. Among other uses, there has been a marked increase in demand for combined phrase cross-referencing engines in name searching tools. Name searching tools exist in several different contexts. For example, several hand held and cellular devices contain address books, and a combined phrase cross-referencing engine is necessary to conveniently search these address books. Similarly, through the advancement of voice recognition technology several companies offer online directories of topics and personnel. Databases such as those of telephone subscribers and hospital patients often require that a human or automated search for names be conducted without complete and accurate specification of spelling and parts. Because the spoken words are not always clear, the most likely possible words are taken from the sounds recognized by the system, and these words are cross-referenced against the company directories.

An effective cross-referencing engine will allow rapid comparison of the combined phrase or phrases to the referenced database. Users are generally unwilling to wait long periods of time to find matches for their queries, and in an environment where a live assistant is available (such as an operator or receptionist when using a voice recognition directory), the user may switch to the live assistant option to avoid the wait time. This would increase expenses to the company by increasing the staffing necessary to respond to the user. With other devices, convenience is a driving factor when a user is choosing a device to purchase. The speed with which a device can process a query may cause a user to purchase one device over another. Therefore, efficiency of the cross-referencing engine is critical in all the devices discussed above.

The other major concern for users in regard to cross-referencing engines is accuracy. When comparing a combined term to a list of single or combined terms, the user wants only the relevant results. However, the user also wants to ensure that no results are omitted. This delicate balance is extremely difficult to achieve. This is especially true with name searches. For such services, if a match is not exact, it is preferable that the differences and similarities be knowledge based ("mohd" is a conventional abbreviation for "Mohamed") rather than "fuzzy" ("Hasan" and "Wasan" differ by one letter.) Frequently, when a name search is performed only a partial name is known. That may be, for example, the first letter of the first name and the entire last name. In this case, the user would want all possible names located. Another common problem is that names are commonly misspelled. For example, the name Thompson is also spelled Thomsen, Thomson, Tomson, Tomsen, and using several other variant spellings. A user may, in some cases, want to find all the variants of this name in case of a misspelling when searching a directory. This is common in company directories and other voice recognition directory systems. Performing an accurate search of a combined term generally consists of a complex series of iterations and lexicographic algorithms. These steps can significantly slow operation of the cross-referencing engine. Therefore, a system is needed in the art that efficiently cross-references a search term and all related variants against a database.

U.S. Pat. No. 6,018,708, entitled "METHOD AND APPARATUS FOR PERFORMING SPEECH RECOGNITION UTILIZING SUPPLEMENTAL LEXICON OF FREQUENTLY USED ORTHOGRAPHIES," discloses a system for obtaining the most likely matches for input speech and introducing additional matches to the list based on prior usage of the system by the speaker. To obtain the most likely matches, multiple comparisons of the spoken word are made to a rated dictionary, and words from the dictionary are eliminated with each comparison according to the ranking of the words as a match to the input word. The additional match added to the list is a word that is introduced based on the frequency that the word was previously selected by the system based on input by the same speaker. The present invention does not use the method of this system. U.S. Pat. No. 6,018,708 is hereby incorporated by reference into the specification of the present invention.

U.S. Pat. No. 6,182,039, entitled "METHOD AND APPARATUS USING PROBABLISTIC LANGUAGE MODEL BASED ON CONFUSABLE SETS FOR SPEECH RECOGNITION," discloses a speech recognizer that generates a list of possible names from input speech by considering a group of acoustic pattern matching sequences. Essentially, because certain letters may be confused with other letters when heard by a speech recognizer (such as "f" and "s"), the speech recognizer considers all possible matches for the input speech. The list is generally compiled using a tree structure, N-gram structure or interactively configured on a network having nodes. The present invention does not operate using the same principles of this system. U.S. Pat. No. 6,182,039 is hereby incorporated by reference into the specification of the present invention.

U.S. Pat. No. 6,557,004, entitled "METHOD AND APPARATUS FOR FAST SEARCHING AND HAND-HELD CONTACTS LIST," discloses a method for searching a database in a hand held device for contacts that match an input data string. The device first searches for first names that match the first name of the data string. The device next searches a "filed as" field that contains first names and last names, company names, and any other user-definable name choice for matches for the data string. The results for the two searches are combined to generate the final result. The present invention does not use this method to perform data matching. U.S. Pat. No. 6,557,004 is hereby incorporated by reference into the specification of the present invention.

U.S. Pat. No. 6,662,180, entitled "METHOD FOR SEARCHING IN LARGE DATABASES OF AUTOMATICALLY RECOGNIZED TEXT," discloses a method for determining possible matches for input words in databases. This method is particularly well suited for optical character recognition and speech recognition, where the input words often are not immediately identifiable. With this method, the database is indexed by a trie data structure having a branch node and a number of leaf nodes, the combination of branch and leaf nodes representing a word. The first letter of the input word is identified, and this letter is used to search the database. The probabilities of the words of the trie structure are calculated based on the input word and the letters found in the particular trie structure. These probabilities are used to generate the results list, which includes the best matches. The present invention does not use this method to find matches for input data. U.S. Pat. No. 6,662,180 is hereby incorporated by reference into the specification of the present invention.

The difficulty in performing a database search when there is a query string that has a large number of possible alternatives (whether due to misspellings, variant transliterations or abbreviations, or erroneous system recognition such as in speech recognition) lies in determining all possible alternatives and comparing these against the database in an efficient manner. If less than all the alternatives are found, it is possible the desired result will be omitted. If the system performs an inefficient comparison, the system will take an inordinately long time to return results to the user. This problem is particularly complicated when the input is a data string containing multiple terms. It is therefore desirable in the art to have a database search system that is capable of efficiently searching multiple input terms, each term having multiple alternative spellings.

SUMMARY OF THE INVENTION

It is an object of the present invention to provide a database searching method that provides all possible matches for a search string the elements of which may have multiple morphologies.

It is a further object of the present invention to provide a database searching method that provides all possible matches for each element of the search string having multiple possible morphologies, wherein the database search matches all possible morphologies for the search string.

It is yet another object of the present invention to provide a database searching method that returns all possible matches for a search string having multiple possible morphologies, wherein the database search accounts for all possible morphologies for the search string and the possible matches are ranked according to the probability of the match being the preferred match for the search string.

The present invention is a method of database searching. The first step of the method is identification of a language for a search string.

The second step of the method is receiving a search string containing at least one primary element, where each primary element includes at least one sub-textual unit.

The third step of the method is attempting to identify at least one unit number associated with a data unit having an identifier matching the primary element for each primary element, wherein the data unit includes a plurality of secondary elements.

The fourth step of the method is if no match is made in the third step then (i) comparing each primary element received in the second step of the method for which no match was made in the third step to a list of prefixes and suffixes to determine if each primary element contains a prefix or a suffix, (ii) determining if each primary element that does not comprise a prefix or suffix contains a compound-prefix, (iii) determining if each primary element that did not have a compound-prefix and did not have a match in step (i) contains a prefix or suffix, (iv) repeating steps (ii) and (iii) according to user preferences, (v) compiling a list of primary elements containing compound-prefixes, (vi) determining the frequency of occurrence of each compound-prefix in the list of primary elements having compound-prefixes, (vii) comparing each compound-prefix associated with a primary element having a match made in step (ii) to each data unit to determine the frequency of occurrence of the compound-prefix in each data unit and storing the frequency of occurrence and the unit number associated with the data unit, (viii) identifying unit numbers associated with each primary element having a compound-prefix or a prefix and suffix, (ix) compiling and prioritizing a list of primary elements that include a compound-prefix or a prefix and suffix and a list of names that do not contain either of the above.

The fifth step is selecting a primary element.

The sixth step is selecting a unit number identified with the primary element.

The seventh step is selecting a primary element not previously selected and returning to the fifth step if there are any primary elements not selected.

The eighth step of the method is initiating a normalized database index.

The ninth step is comparing the data units associated with each of the unit numbers selected in the seventh step with a database index containing strings normalized by the same system into a sequence of unit numbers.

The tenth step is outputting the results of the ninth step.

The eleventh step is if any primary element has a plurality of unit numbers identified with it proceeding to the twelfth step, otherwise stopping.

The twelfth step is selecting a unit number not previously selected for each primary element having a plurality of unit numbers identified with it, and having at least one unit number not previously selected, otherwise selecting a unit number identified with each other primary element.

The thirteenth step is comparing the data units associated with each of the unit numbers selected in the twelfth step with the similarly normalized database index, as in the ninth step.

The fourteenth step is outputting the results of the thirteenth step.

The fifteenth step is returning to the twelfth step if any primary element has a unit number identified with it that has not been selected, otherwise stopping.

DETAILED DESCRIPTION OF THE PREFERRED EMBODIMENT

Figure 1:
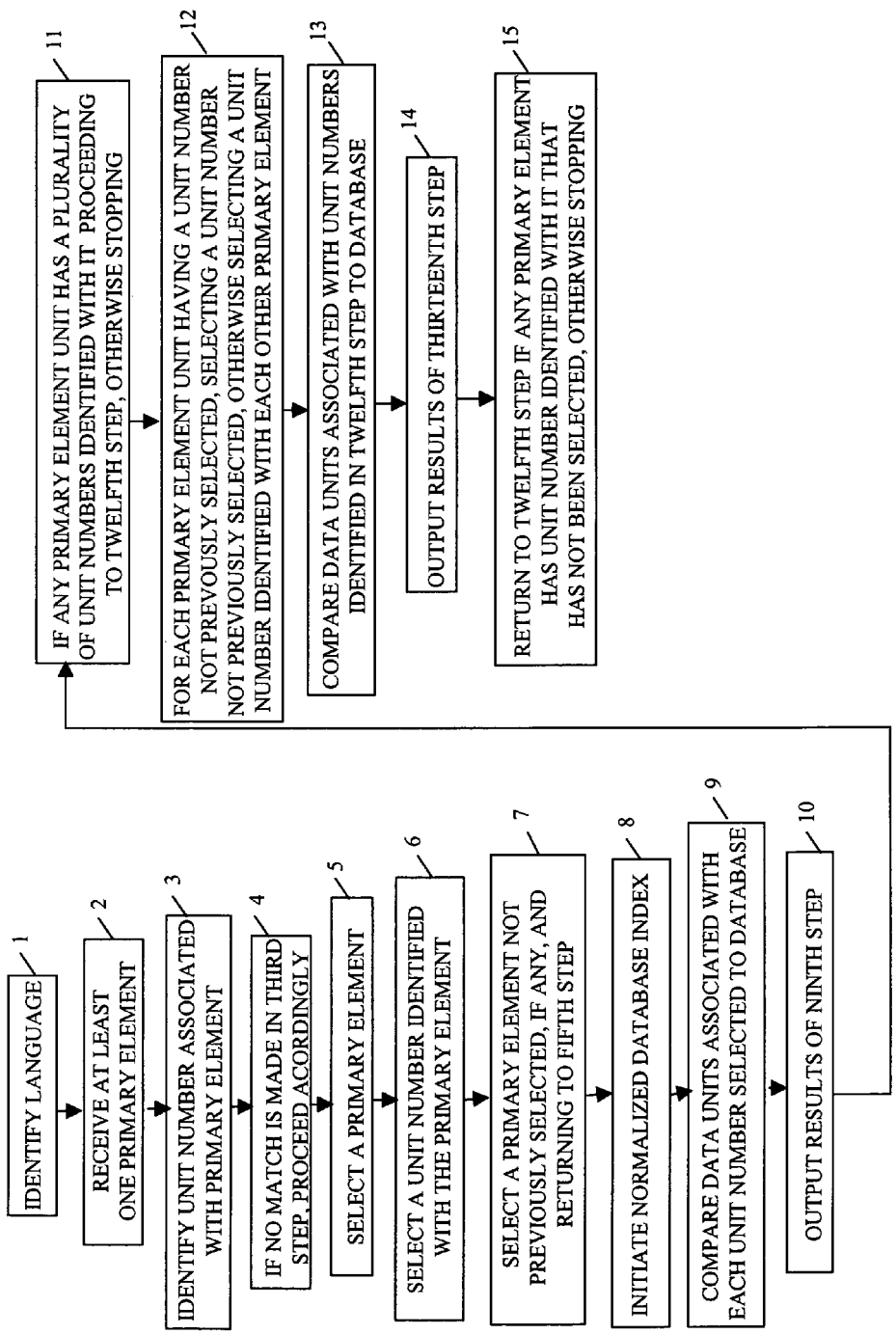
FIG. 1 is a flowchart of the steps of the present invention.

The present invention is a method of database searching. FIG. 1 is a list of the steps of the method of the present invention. The first step 1 of the method is selecting a language. The language selected should be the language of the data to be analyzed by the system. Any language can be analyzed using the method of the present invention as would be obvious to one of skill in the art, such as English, French, Albanian, Basque, Greek, Turkish, Hindi or Japanese. A string may be multi-lingual or multi-cultural.

The second step 2 of the method is receiving at least one primary element, where each primary element includes at least one sub-textual unit. An element is any distinct, independent string of letters or symbols that comprise a word. For example, an element may be an English word composed of multiple letters from the Latin alphabet, a Chinese symbol representing a word, or a Japanese word comprised of Kanji symbols. An element may also be an alphanumeric identifier, such as a telephone number or e-mail address. Many other elements are possible and will vary depending on the language, as would be obvious to one of skill in the art. In the preferred embodiment, the elements represent portions of names, such as a first, middle or last name.

A sub-textual unit is a subset of a word within a single element, typically a character or portion of a symbol. Different languages use different methods for representing words. For example, English uses combinations of letters from the Latin alphabet to represent words, each letter comprising a sub-textual unit. Japanese uses Kanji symbols, each Kanji symbol typically comprising a single sub-textual unit. As is obvious to one of skill in the art, the specific characters or symbols that comprise a sub-textual unit will depend on the language at issue.

The third step 3 of the method is identifying at least one unit number associated with a data unit having a secondary element matching the primary element for each primary element, wherein the data unit includes a plurality of secondary elements. A data unit is a group of associated elements, the units being associated because of morphological characteristics. In the preferred embodiment, a data unit contains all possible morphologies of a given element. In an alternative embodiment, morphologies for a given element may be split among multiple data units. All these possible morphologies comprise the secondary elements. Each data unit has a unit number. A unit number is a unique identifier for a data unit. Matching a single secondary element in a data unit allows all the secondary elements in the data unit to be obtained. Unit numbers are essential to differentiate these data units, especially when data units contain secondary elements having similar morphologies. Unit numbers are, therefore, preferably associated with each data unit. In an alternative embodiment, a primary element may match a data unit that includes affixes along with secondary element morphologies. In this case, the data unit identifies the structure of the primary element in terms of components of unit numbers. As is known in the art, an affix is a prefix or suffix. For example the Arabic name, "BALOUSHI" is known to be linguistically correct as compound prefix "BAL" followed by primary element, "OUSHI". The unit number will represent both components such that other possible combinations of sub-textual units as described in the steps below are not considered. In this example, prefix "B" plus primary element "ALOUSHI" are not considered. Other combinations that would result in the same name are removed as possible results and only the combination provided in conjunction with the single unit number is provided as a possibility for a match.

The fourth step 4 of the method is, if for any primary element no match is made in the third step 3 of the method (i) comparing each primary element received in the second step 2 of the method for which no match was made in the third step 3 of the method to a list of prefixes and suffixes to determine if each primary element comprises a prefix or a suffix, (ii) determining if each primary element that does not comprise a prefix or suffix contains a compound-prefix and a data unit matching the remaining sub-textual units of the primary element, (iii) determining if each primary element that does not have a compound-prefix and did not have a match in step (i) contains a prefix and/or suffix and a data unit matching the remaining sub-textual units of the primary element, (iv) repeating steps (ii) and (iii) according to user preferences, (v) compiling a list of primary elements containing compound-prefixes or affixes, (vi) determining the frequency of occurrence each compound-prefix in the list of primary elements having compound-prefixes, (vii) comparing each compound-prefix associated with a primary element having a match made in step (ii) to each data unit to determine the frequency of occurrence of the compound-prefix in each data unit and storing the frequency of occurrence and the unit number associated with the data unit, (viii) identifying unit numbers associated with each primary element contained in the list of primary elements having a compound-prefix or a prefix and/or suffix, (ix) compiling and prioritizing a list of primary elements that include a compound-prefix or a prefix and/or a suffix and a list of names that do not contain either of the above.

If a match is not made to a data unit in the third step 3 of the method, the element must be further broken down to find a match to a data unit. This is done using the series of steps described above, which will be discussed in greater detail with reference to FIG. 2.

Figure 2:
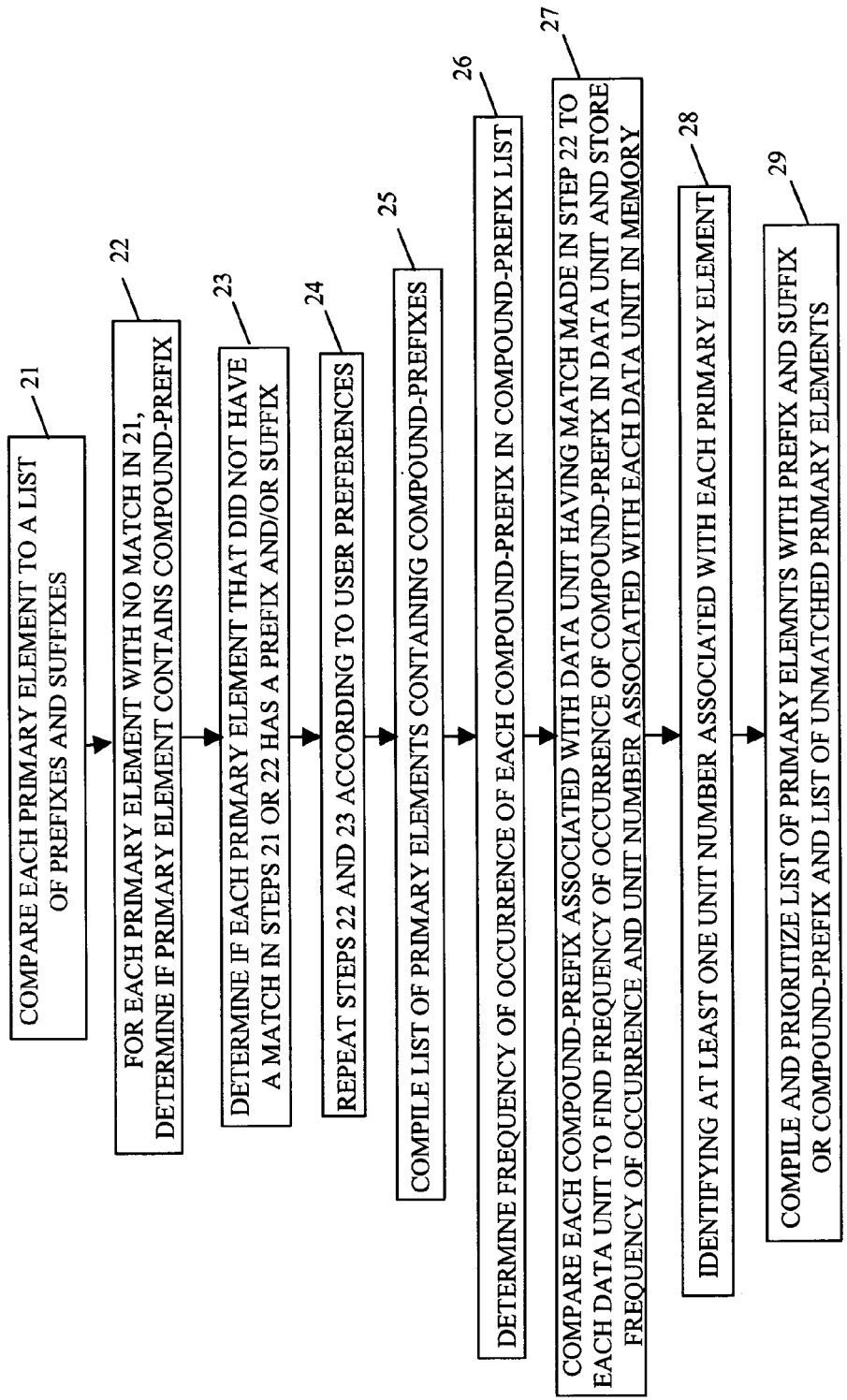
FIG. 2 is a flowchart detailing the steps of the fourth step of the method in FIG. 1.

FIG. 2 is a list of steps to analyze an element according to the fourth step 4 of the method listed in FIG. 1. The first step 21 of the matching method of FIG. 2 is comparing each primary element received in the second step 2 of the method to a list of prefixes and suffixes to determine if each primary element comprises a prefix or a suffix. The prefix and suffix list contain known prefixes and suffixes specific to the language selected in the first step 1 of the method. For example, if the language selected in the first step 1 of the method is Arabic, examples of known prefixes are "Al," "Bin" and "El" and examples of known suffixes are "Adin," "Dine" and "Uden." The comparison may be done through a computerized comparison through any conventional method or may be done by a trained linguist comparing the primary elements received in the second step 2 of the method to a list of prefixes and suffixes to identify the appropriate names. One method by which a linguist may perform this task is by being presented with the primary elements by means of a computer screen and using any conventional method, such as a mouse or a keyboard, to identify the prefix or suffix regions of the primary element after performing the appropriate comparison, however any other conventional method may be used to identify the prefixes and suffixes as would be obvious to those of skill in the art. Any prefixes or suffixes would then be added to a corresponding prefix or suffix list.

The second step 22 of the matching method is determining if each primary element that does not comprise any prefixes or suffixes contains a compound-prefix. To determine if a name element includes a compound-prefix, each name element can be compared to a compound-prefix list that contains known compound-prefixes specific to the language selected in the first step 1 of the method of FIG. 1. For example, if the language selected is Arabic, examples of known compound-prefixes are "Abel," "Bal" and "Bul." The comparison may be done through a computerized comparison through any conventional method or may be done by a trained linguist comparing the primary elements received in the second step 2 of the method to a list of compound-prefixes to identify the appropriate names.

The third step 23 of the matching method of FIG. 2 is determining if each primary element that does not have a compound-prefix and did not have a match in the first step 21 of the matching method contains a prefix and/or a suffix. In the third step 23 of the matching method, a second review is performed of all unmatched primary elements to determine if the primary elements contain a prefix and/or a suffix. Several methods can be used to perform this second review. For example, if in the first step 21 and second step 22 of the matching method a computer comparison was performed to determine if any prefixes and/or suffixes were present in each name element, in the third step 23 of the method a skilled linguist could compare each unmatched primary element to a list of prefixes and/or suffixes to identify prefixes and suffixes that were not previously identified. Similarly, if the first step 21 and second step 22 of the matching method were performed by a linguist, the second review could be performed by a computer comparison of each unmatched primary element against lists of prefixes, suffixes and compound-prefixes to find matches not previously made by the linguist. An optional step is splitting the matched primary elements into three groups—primary elements having prefixes and/or suffixes, primary elements having compound prefixes and suffixes and unmatched primary elements. Methods of splitting matched and unmatched primary elements into groups are well known in the art. Such methods include having a computer program to automatically perform this splitting or having a linguist split the primary elements in two after reviewing the primary elements displayed on a monitor by means of a mouse or keyboard. If the lists are not split at this time, they will be split in a later step as will be explained in greater detail below.

The fourth step 24 of the matching method is repeating the second step 22 and third step 23 according to user preferences. If the user determines additional matches are possible for the processes of the second step 22 and the third step 23, the user may repeat the second step 22 and third step 23 of the method until the user is satisfied all matches have been made. As an alternative, if the optional step of splitting the primary elements into three groups is performed, the second step 22 and third step 23 could be repeated for less than all of the primary elements. For example, the second step 22 and third step 23 for only the unmatched primary elements or for the unmatched primary elements and the primary elements on one of the other two lists.

The fifth step 25 of the matching method is compiling a list of primary elements containing compound prefixes. As was discussed briefly above, it is optional to compile the list of primary elements containing compound-prefixes in the third step 23 of the matching method. If this is done, then this step is omitted. However, if the step is not performed in conjunction with the third step 23 of the matching method, after completion of the matching in the second step 22 through fourth step 24 a list is compiled of all primary elements containing compound prefixes. As was discussed in greater detail above, this list can be created through any conventional method, such as by way of a computer program or a skilled linguist identifying and selecting the appropriate primary elements.

The sixth step 26 of the matching method is determining the frequency of occurrence of each compound-prefix in the list of primary elements having compound-prefixes. To determine the frequency of occurrence of the compound-prefixes in the list of primary elements, the number of occurrences of each compound-prefix in the list of compound prefixes is calculated from a random collection of sample names and, in the preferred embodiment, are stored in the memory of a computer system. In the preferred embodiment a computer system calculates the frequency of occurrence of the compound-prefixes, however any other suitable method of prioritizing the list of primary elements may be used in conjunction with the present invention. For example, a skilled linguist could determine the frequency of occurrence of the compound-prefixes and manually enter them into the database of a computer system.

The seventh step 27 of the matching method is comparing each compound-prefix associated with a primary element having a match made in the second step 22 to each data unit to determine the frequency of occurrence of the compound-prefix in each data unit and storing the frequency of occurrence and the unit number associated with the data unit in a persisted state (as in memory, or a database). As was explained in detail above, a data unit is a group of associated secondary elements. In the seventh step 27 of the matching method each compound-prefix that has been identified as occurring in the primary elements received in the second step 22 of the method of FIG. 2 is compared to the data units to determine which data units contain secondary elements that include the compound-prefix. This allows the method to prioritize the primary elements according to the frequency with which the compound-prefixes occur in certain data units and the probability that a primary element is an element of interest, as will be explained in greater detail below. Methods of comparing a primary element to a list of elements are obvious to those of skill in the art, such as basic cross-referencing techniques, and will not be explained in detail. After the analysis has been done to determine the frequency with which each compound-prefix occurs in each data unit, the unit identifier associated with each data unit is stored with the number of occurrences of the compound-prefix in the corresponding data unit. In the preferred embodiment this information is stored in the same database as the total occurrences of each compound-prefix that was calculated in the sixth step 26 of the matching method of FIG. 2 that was explained in greater detail above. If this method is used, the total number of occurrences is preferably associated with the compound-prefix, and each unit-number the compound prefix appeared in and the number of occurrences of the compound-prefix in the corresponding unit number. Although in the preferred embodiment all of the steps described in relation to the seventh step 27 of the matching method are performed through a computerized process, any other suitable method may be used in conjunction with the present invention.

The eighth step 28 of the matching method is identifying at least one unit number associated with each primary element having a compound-prefix or a prefix and/or suffix, wherein the unit number is identified by removing the prefix and suffix or compound-prefix from the primary element and comparing the remaining sub-textual units of the primary element to secondary element to find a match, each secondary element being associated with a unit number. Essentially, by identifying any prefix, suffix or compound-prefix and isolating the base element, the method of FIG. 2 has performed the same function of the third step 3 of the method of FIG. 1. That is, in the method of FIG. 2, a prefix, suffix or compound-prefix was eliminated allowing the appropriate element to be identified, leading to identification of the correct morphologies and unit number to be identified with the selected primary element. This becomes clear with names like "AlHassan" in Arabic. In some cases, the "Al" stands alone. In others, the "Al" is combined with the "Hassan," requiring the method of FIG. 2 for the proper association of the selected primary element with appropriate data units.

The ninth step 29 of the matching method is compiling and prioritizing a list of elements that include a compound-prefix or a prefix and a suffix and the associated unit numbers and a list of names that do not contain either of the above. In the eighth step 28 of the matching method the list of primary elements containing compound-prefixes and the list of primary elements containing prefixes and suffixes are combined. Additionally, all other name elements are put into a single list of unmatched name elements, if such a list has not already been created in a previous step. To prioritize the list of primary elements containing compound-prefixes and primary elements containing prefixes and suffixes, in the preferred embodiment the list is first alphabetized. In most cases, several primary elements will be identical. For example in Arabic the name "AiHassan" or "Balouchi" may appear more than once in a set of primary elements received in the second step of the method of FIG. 2. To prioritize the list, the primary elements that contain compound-prefixes are prioritized based on the frequency with which the primary elements occur in each data unit as calculated in the seventh step 27 of the matching method. If a primary element, for example "Balouchi" that contains a compound-prefix is in two groups, say 1 and 2, and occurs 20 times in group 1 and 30 times in group 2, then "Balouchi" associated with group 2 would be listed first and "Balouchi" associated with group 1 would be listed second. A primary element may also contain a compound-prefix and not be found in a data unit, although it is identical to other primary elements, either due to its relation to other primary elements or due to unusual splits in the sub-elements. All of the primary elements are listed last alphabetically of the identical primary elements in the preferred embodiment. The unmatched primary elements are not associated with unit numbers, and therefore are prioritized only in alphabetical order.

The fifth step 5 of the method is selecting a primary element. A user-definable primary element may be selected, however in the preferred embodiment the first element in the string of elements is selected. A primary element can be selected using any conventional method, many of which are well known and commonly used in the art, such as selecting the desired element with a keyboard.

The sixth step 6 of the method is selecting a unit number identified with the primary element. As was discussed in greater detail above with reference to the third step 3 and fourth step 4 of the method, unit numbers are associated with each primary element. These unit numbers identify data units containing multiple alternative morphologies of the selected primary element. As was also discussed in greater detail above, a single primary element may be identified with more than one unit number, in which case the first ordered unit number is preferably selected in the fifth step 5 of the method. Where a unit number cannot be obtained, it may be represented by the primary element.

The seventh step 7 of the method is selecting a primary element not previously selected and returning to the fifth step 5 if there are any primary elements not selected. As was discussed in greater detail above, in the preferred embodiment, if multiple elements were received in the second step 2, in the preferred embodiment the next element in the string of elements that was not previously selected is selected in the seventh step 7. However, any primary element in the string of primary elements may be selected according to user preferences.

The eighth step 8 of the method is initiating a similarly normalized database index. The database index contains a number of normalized identifiers, each identifier being linked to information in a database that is of interest to the user. In the preferred embodiment, each identifier in the database (derived from the identifiers occurring in the data) consists of a series of unit numbers produced by the same algorithm used for the query string. The identifiers are compared to the unit numbers of each data unit to find matches, as will be explained in greater detail with reference to the tenth step 10 of the method.

The information in the database that is linked to the database index may take the form of a contact list, telephone directory, text document, or other compilation of data according to user preferences. As would be obvious to one of skill in the art, the database contains a plurality of elements, these elements preferably being grouped, such as into name units or similar groupings allowing them to be compared to search strings of similar type input by the user. As is further obvious to those of skill in the art, there are several methods of grouping elements in databases, such as inserting grouped elements in a single field in a database having multiple fields. In a preferred embodiment multiple databases exist, and the user selects one or more databases for comparison to query strings.

As was discussed in greater detail above, each unit number is associated with a data unit, and each data unit includes a plurality of secondary elements. The combinations of unit numbers are matched to pre-computed groupings of identifiers for phrases in the database as was explained in greater detail above. In an alternative embodiment, wildcard terms, such as previously omitted prefixes, may be included with the data units to perform a more thorough search. Methods of including additional terms in a database search are well known to those skilled in the art, and any conventional method can be used in conjunction with this invention. This comparison is performed for the data units associated with each primary element selected in the seventh step 7, thus if a search term contains multiple elements the search of the database will return results matching all or some of the elements according to user preferences. In a preferred embodiment the results are ranked based on the number of terms matched. The results may be further ranked according to probabilities associated with each secondary element. For example, if a secondary element is particularly likely to appear in a given language this information will be stored along with the secondary element in each data unit. When this secondary element is matched in a database a result containing this secondary element will be ranked lower than a result containing a secondary element that occurs less often.

Figure 3:
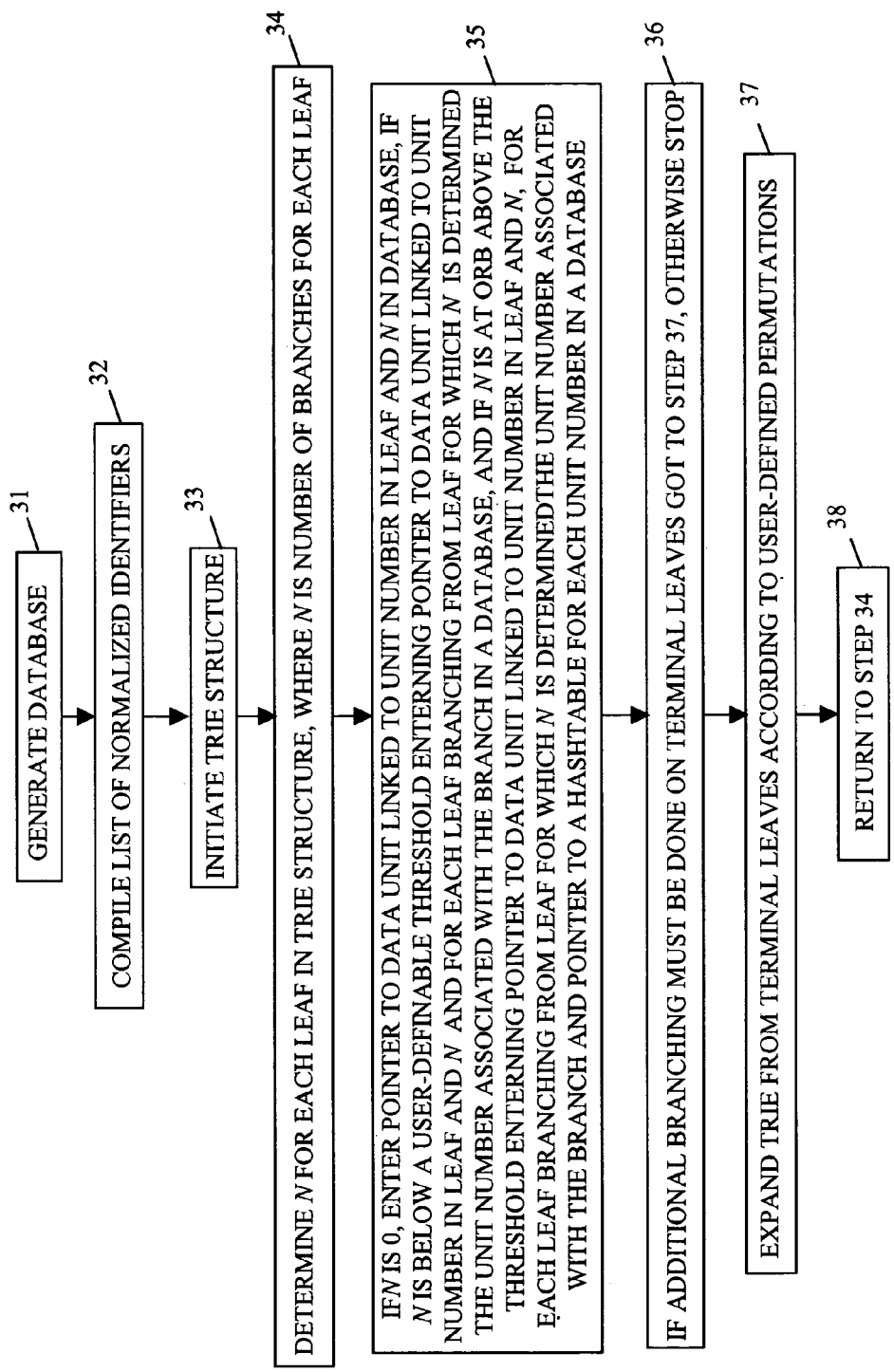
FIG. 3 is a flowchart detailing the steps of the ninth step of the method of FIG. 1.

The database will be discussed in greater detail with reference to FIG. 3. The first step 31 of the initialization method is generating a database. Many databases are available in the art that can be used in conjunction with the present invention, however a custom database may be programmed to operate with the present invention and is preferably developed in the preferred embodiment. The elements of the database required for operation will be become apparent with reference to the description below. Methods of programming a database will be obvious to those of skill in the art, and many commercial database programs are available that can also be used in conjunction with present invention and appropriately programmed to operate in conjunction with the present invention.

The second step 32 of the initialization method is compiling a list of normalized identifiers, wherein each normalized identifier consists of one or more unit numbers. As was explained above, each unit number in the normalized identifier is linked to a data unit having an identifier matching an element in the normalized identifier. The data units contain a number of secondary elements, as was explained in greater detail above.

The third step 33 of the initialization method is initiating a trie structure including at least a root and a leaf for each element of the normalized identifier. An element of the normalized identifier is, for example, a name element. For example the Arabic name "Abdul Umar Mohamed" would have three elements. The initiated trie structure would be constructed of a root node and a node for each element of the normalized identifier. Each element would have no leaf nodes when initiated, as would be obvious to those of skill in the art.

The fourth step 34 of the initialization method is determining N for each leaf in the trie, wherein N is an integer representing the number of alternative branches stemming from each leaf of the trie. In the fourth step 34 of the method, the number of branches of the trie structure developed to achieve the normalized identifier given the data units identified in the second step 32 of the initialization method is calculated. As is obvious to those of skill in the art, a trie structure generally begins with no branching from the elements of the normalized identifier. The topmost leaves, in this case the elements of the normalized identifier, would have zero branches, and therefore $N_1$ would be zero. Given the Arabic name "Abdul Umar Mohamed," three data units would be identified in the normalized identifier. The unit number for each data unit identified with each name in the Arabic name above would be a leaf descending from the root node. The further construction of the trie will be explained in greater detail below, however in summary additional leaves will be built from the originating leaves of the elements of the normalized identifier. For example, assuming each unit number of the normalized identifier is matched with a number of data units, each of these data units would be branches from the leaf node. If, as an example, there were 10 data units linked to a given unit number there would be 10 branches from initial leaf node. $N_1$ would then be 10 and $N_2$ for each of the data units would be 0 for each of the data units. Each of these leaf nodes would then point to a number of unit numbers having an identifier matching an element of the leaf. Each leaf points to a number of data units until no further data units are matched. Each of these data units would contain a number of secondary elements. As each leaf spawns branches, the integer number N for that leaf is determined. The number N will be recalculated for each leaf of the trie until the terminal node is reached, as would be obvious to those of skill in the art.

In the fifth step 35 of the initialization method is, if N is zero entering in a data base N and a pointer to the data unit linked to the unit number associated with the leaf node, if N is below a user definable threshold entering in a database N and a pointer to data unit linked to the unit number associated with the leaf node and for each leaf node descending from a branch the unit number associated with the branch and a pointer to the associated data unit, and if N is at or above a user definable threshold entering in a database N and a pointer to the data unit linked to the unit number associated with the leaf node and for each leaf node descending from a branch the unit number associated with the branch, a pointer to the associated data unit and a pointer to a hash table for each unit number. The database can be specifically designed for the present invention according to meet user-definable specifications, or can be a commercially available database. With the use of a commercially available database all data is stored in a single file and internally linked for cross-reference. The hash table shall include a hash of each unit number that will be compared to the hash of the unit number from the pointer and a pointer to a data unit. After a match is made in a hash table, the pointer to a data unit is located and will be used just as it is when N is below the user definable threshold as is explained below. When N is below a user definable threshold, a unit number in the trie structure is associated with a pointer to a data unit. The data unit includes all morphological derivations of a given element. Each leaf node includes the unit number and the pointer to the associated data unit. This accounts for all branches in the series. When N is at or above the user-definable threshold an additional cell is added when entering information in the database that includes a pointer to a hash table. The hash is of the unit number, as was explained in greater detail above. This allows increases in the processing speed in the event a specific node has a large number of branches for reasons that are obvious to those of skill in the art. In place of a hash table, other suitable structures such as HashMaps can be substituted. Such structures are substituted based on the specific software environment in which the present environment is implemented. For example, HashMaps are efficient methods of storing data in a Java environment.

Additionally, data can be stored in secondary memory, or hard disk space, as opposed to primary memory, or system memory. Many modern operating systems are constructed using a system of directories and subdirectories. Operating systems such as UNIX and Windows® typically allow at least 32,000 subdirectories for each directory. To implement the trie structure described above in such a system each node is a directory and each branch is a subdirectory of the system. Leaves are implemented as files, each file containing the necessary data to be stored along the specified path. This allows permanent storage of large sets of data. In the event of power failure there is no loss of data in the directory/subdirectory system described herein.

The sixth step 36 of the initialization method is if additional branching must be performed on the terminal leaves of the trie proceeding to the seventh step 37 of the initialization method, otherwise stopping. If additional branching must be performed on the terminal nodes, the method proceeds and additional branching is performed as discussed below. If no additional branching is necessary the process terminates and the entire database is completed and ready for use.

The seventh step 37 of the initialization method is expanding trie from terminal leaves according to user-defined permutations. As is obvious to those of skill in the art, several combination are possible given the originating leaf nodes. Each leaf can be examined separately and each leaf can be combined with all other leaves or with any subset thereof. If the originating normalized identifier contained four elements, and all possible combinations were to be evaluated there would be one four element sequence, four three element sequences, six two element sequences and four one element sequences. However, the user may only be interested in four and three element sequences, or some other subset thereof. Therefore, the leaf nodes branch according to these user defined permutations. Additionally, as was explained in greater detail above, each element in the normalized identifier will be associated with a number of unit numbers. Therefore, for each permutation the user defines all unit number combination will also have to be examined. This may result in a large number of combinations.

The eighth step 38 of the initialization method is returning to the fourth step 34 of the initialization method. After additional nodes have been added to the trie, each N for each leaf must be recalculated and entered into the database. Because new nodes will have new branches, most database entries will not change, however each previous terminal node will now have branches that will require recalculation and new terminal nodes have appeared that will require entries in the database. Therefore, the initialization returns to the fourth step 34 for recalculation of N and reentry of information into the database.

The ninth step 9 of the method is comparing data units associated with each of the unit numbers selected in the eighth step 8 with the similarly normalized database index. As was discussed above, identifiers in the database are compared to the unit numbers of each data unit to find matches. As was discussed in detail above, each unit number is associated in a normalized database to a pointer to a data unit to allow efficient identification of a data unit once a unit number has been matched. This enables a very fast and flexible comparison of query string and indexes. The degree of tolerance for a match is user-definable, therefore if a search string contains three elements and results in a search having three unit numbers, the user may require an exact match, a three number match, or a single number match.

The tenth step 10 of the method is outputting the results of the ninth step 9. As was discussed in greater detail above, the comparison of the data units to the database results in matches of the secondary elements to elements in the database. In the preferred embodiment, these results are ranked by the number of primary elements in the input string matched and the probability associated with the secondary elements. The results output by the system are in the form of the information linked to the identifiers in the database index, and therefore generally take the form of a natural name, alphanumeric sequence, or other normalized form of a string of elements. These matches are output using any conventional means, such as outputting the data to a computer monitor in HTML format.

The eleventh step 11 of the method is if any primary element has a plurality of unit numbers identified with it proceeding to the twelfth step 12, otherwise stopping. As was discussed in greater detail above, a primary element may be associated with multiple unit numbers and, consequently, multiple data units. If this is the case, the method proceeds to the twelfth step 12. Otherwise, the method is stopped.

The twelfth step 12 of the method is selecting a unit number not previously selected for each primary element having a plurality of unit numbers identified with it, and having at least one unit number not previously selected, otherwise selecting a unit number identified with each other element. As was discussed in greater detail above, a primary element may be identified with more than one unit number, and therefore more than one data unit. To ensure all possible morphologies are considered when searching a database, all data units associated with a primary element must be compared to the database index. Therefore, if any data units remain that are associated with a primary element that have not been compared to a database index, the unit numbers for these data units are selected to provide a thorough comparison between the primary elements and the database. If all unit numbers have already been selected for a primary element, any unit number can be selected for that element, as all unit numbers have a thorough analysis already performed for all data units associated with that primary element. In an alternative embodiment, that element can be omitted. In a further alternative embodiment, wildcard characters can be entered, for example, wildcards representing prefixes, to perform a more permissive search.

The thirteenth step 13 of the method is comparing the data units associated with each of the unit numbers selected in the twelfth step 12 with the database index. The comparison performed in the thirteenth step 13 of the method is essentially the same as the comparison performed in the ninth step 9 of the method, and therefore will not be discussed in detail. To summarize, the elements contained in all data units associated with the unit numbers selected in the twelfth step 12 of the method are compared to the database index to find matches. These matches can be ranked according to user preferences.

The fourteenth step 14 of the method is outputting the results of the thirteenth step 13 of the method. As was discussed in greater detail above, the results are the results of the comparison of the data units to the database index associated with each database. The associated information for match by the comparison performed in the thirteenth step 13 of the method is preferably output by the system in the fourteenth step 14 of the method. In the preferred embodiment, these results are ranked by the number of primary elements in the input string matched and the probability associated with the secondary elements or the combined data units These matches are output using any conventional means, such as outputting the data to a computer monitor in HTML format.

The fifteenth step 15 is returning to the twelfth step 12 if any primary element has a unit number identified with it that has not been selected, otherwise stopping. As was discussed in greater detail above, to perform a thorough search all data units associated with a primary element must be compared to the database. To accomplish this, all unit numbers identified with each primary element must be selected and the associated data units must be compared to the database according to the method of the present invention. If any unit numbers remain that have not been selected, the method returns to the thirteenth step 13 for further processing of the primary elements. Otherwise the method stops.

What is claimed is:

1. A method of text searching to locate text and morphologies and variations of the text, comprising the steps of:
    a) selecting in a computing device a language;
    b) receiving in the computing device at least one primary element, where each primary element includes at least one sub-textual unit, where the primary element is selected from the group of primary elements consisting of letters and symbols, and where the primary element is selected from the elements consisting of the primary element misspelled so that it does not match any properly spelled primary element, a concatenation of the primary element with another primary element, and the primary element misspelled so that it matches a properly spelled but unintended primary element;
    a) identifying in the computing device at least one unit number associated with a data unit having a secondary element matching the primary element for each primary element received in step (b), wherein the data unit includes a plurality of secondary elements, where each secondary element is comprised of a secondary element selected from the group of secondary elements consisting of a morphology of the primary element and a variation of the primary element, where the variation includes a misspelling and a concatenation, and where the at least one unit number is unique identifier;
    d) if no match is made in step (c), then:
        (i) comparing in the computing device each primary element received in the step (b) to a list of prefixes and suffixes to determine if each primary element comprises a prefix or a suffix;
        (ii) determining in the computing device if each primary element for which a match was not made in step (i) contains a compound-prefix;
        (iii) performing in the computing device a third analysis to determine if each primary element for which a match was not made in steps (i) and (ii) of step (d) contains a prefix, suffix or both;
        (iv) repeating steps (ii) and (iii) according to user preferences;
        (v) compiling in the computing device a list of primary elements containing compound-prefixes identified in step (ii);
        (vi) determining in the computing device the frequency of occurrence of each compound-prefix in the list of primary elements having compound-prefixes compiled in step (v);
        (vii) comparing in a computer system each compound-prefix associated with a primary element having a match made in step (ii) to each data unit to determine the frequency of occurrence of the compound-prefix in each data unit and storing the frequency of occurrence and the unit number associated with the data unit including the compound-prefix in memory;
        (viii) identifying in the computing device at least one unit number associated with each primary element having a compound-prefix or having a prefix, suffix or prefix/suffix combination, wherein the unit number is identified by removing the prefix, suffix or compound-prefix from the primary element and comparing the remaining sub-textual units of the primary element to secondary element to find a match, each secondary element being associated with a unit number; and (ix) compiling and prioritizing in the computing device a list of primary elements that include a compound-prefix or a prefix, suffix or prefix/suffix combination and a list of names that do not contain either of the above;

e) selecting in the computing device a primary element;

f) selecting in the computing device a unit number identified with the primary element;

g) if there are any primary elements not selected, selecting in the computing device a primary element not previously selected and returning to step (e);

h) initializing in the computing device at least one normalized database index;

i) comparing in the computing device the data units associated with each of the unit numbers selected in step (f) with the normalized database index;

j) outputting from the computing device the results of step (i) consisting of results selected from the group of results consisting of the primary element, at least one morphology of the primary element, and at least one variation of the primary element, where the variation includes a misspelling and a concatenation;

k) if any primary element has a plurality of unit numbers identified with it proceeding to step (l), otherwise stopping;

l) for each primary element having a plurality of unit numbers identified with it, and having at least one unit number not previously selected, selecting in the computing device a unit number not previously selected, otherwise selecting in the computing device a unit number identified with each other primary element;

m) comparing in the computing device the data units associated with each of the unit numbers selected in step (l) with at least one database index;

n) outputting in the computing device the results of step (m) consisting of results selected from the group of results consisting of the primary element, at least one morphology of the primary element, and at least one variation of the primary element, where the variation includes a misspelling and a concatenation; and o) if any primary element has a unit number identified with it that has not been selected, returning to step (l), otherwise stopping.

2. The method of claim 1, wherein the step of initializing at least one normalized database further includes the steps of:

2-i) generating in the computing device a database;

2-ii) compiling in the computing device a list of normalized identifiers, wherein each normalized identifier consists of one or more unit numbers;

2-iii) initiating in the computing device a trie structure, wherein the trie structure includes at least one root node and at least one leaf node for each unit number of the normalized identifier;

2-iv) determining in the computing device N for each leaf in the trie structure, where N is an integer representing the number of branches stemming from each leaf in the trie;

2-v) if N is zero entering in the database N and a pointer to the data unit linked to the unit number associated with the leaf node, if N is below a user-definable threshold entering in the database N, a pointer to the data unit linked to the unit number associated with the leaf node, and for each leaf descending from a branch of leaf having the value for which N was calculated the unit number associated with the leaf of the branch and a pointer to the data unit associated with the unit number of the leaf, and if N is at or above a user definable threshold entering in the database N, a pointer to the data unit linked to the unit number associated with the leaf node, for each leaf descending from a branch of leaf having the value for which N was calculated the unit number associated with the leaf of the branch and a pointer to the data unit associated with the unit number of the leaf and a pointer to a hash table for each unit number;

2-vi) proceeding to step 2-vii) of claim 2 if additional branching of the trie must be performed according to user-defined permutations, otherwise stopping;

2-vii) expanding the trie structure from the terminal leaves according to user defined permutations; and 2-viii) returning to step 2-iv) in claim 2.

3. The method of claim 2, further including the step of ranking in the computing device the result of top level step (i) in claim 1.

4. The method of claim 3, further including the step of ranking in the computing device the result of step (m).

5. The method of claim 4, wherein the step of performing in the computing device a third analysis to determine if each primary element for which a match was not made in steps (i) and (ii) of step (d) contains a prefix, suffix or both comprises performing in the computing device a third analysis to determine if each primary element for which a match was not made in steps (i) and (ii) of step (d) contains a prefix, suffix or both, wherein the third analysis comprises comparing each primary element for which no match was not made in steps (i) and (ii) of step (d) to a second list of known prefixes and suffixes.

6. The method of claim 4, wherein the step of determining in the computing device if each primary element for which a match was not made in step (i) of step (d) contains a compound-prefix comprises determining in the computing device if each primary element for which a match was not made in step (i) of step (d) contains a compound-prefix, wherein each primary element for which a match was not made is compared to a list of known compound-prefixes to determine if the primary element contains a compound-prefix.

7. The method of claim 1, further including the step of ranking in the computing device the result of step (i) of step (d).

8. The method of claim 1, further including the step of ranking in the computing device the result of step (m).

9. The method of claim 1, wherein the step of performing in the computing device a third analysis to determine if each primary element for which a match was not made in steps (i) and (ii) of step (d) contains a prefix, suffix or both comprises performing in the computing device a third analysis to determine if each primary element for which a match was not made in steps (i) and (ii) of step (d) contains a prefix, suffix or both, wherein the third analysis comprises comparing each primary element for which no match was not made in steps (i) and (ii) of step (d) to a second list of known prefixes and suffixes.

10. The method of claim 1, wherein the step of determining in the computing device if each primary element for which a match was not made in step (i) of step (d) contains a compound-prefix comprises determining in the computing device if each primary element for which a match was not made in step (i) of step (d) contains a compound-prefix, wherein each primary element for which a match was not made is compared to a list of known compound-prefixes to determine if the primary element contains a compound-prefix.

11. The method of claim 6, wherein the step of generating in the computing device a database comprises generating a database, wherein the database comprises at least one directory and at least one subdirectory.

12. The method of claim 11, wherein the step of initiating in the computing device a trie structure, wherein the trie structure includes at least one root node and at least one leaf node for each unit number of the normalized identifier comprises initiating in the computing device a trie structure, wherein the trie structure includes at least one root node and at least one leaf node for each unit number of the normalized identifier, wherein the at least one root node comprises a directory and the at least one leaf node comprises a file the at least one subdirectory.

13. A method of text searching to locate text and morphologies and variations of the text, comprising the steps of:
  a) selecting in a computing device a language;
  b) receiving in the computing device at least one primary element, where each primary element includes at least one sub-textual unit, where the primary element is selected from the group of primary elements consisting of letters and symbols;
  c) identifying in the computing device at least one unit number associated with a data unit having a secondary element and affix matching the primary element for each primary element received in step (b), wherein the data unit includes a plurality of affixes and secondary elements, where each secondary element is comprised of a secondary element selected from the group of secondary elements consisting of a morphology of the primary element and a variation of the primary element, and where the variation includes a misspelling and a concatenation;
  d) identifying in the computing device at least one unit number associated with a data unit having a secondary element matching the primary element for each primary element received in step (b) that was not identified in step (c), wherein the data unit includes a plurality of secondary elements, where each secondary element is comprised of a secondary element selected from the group of secondary elements consisting of a morphology of the primary element and a variation of the primary element, and where the variation includes a misspelling and a concatenation;
  e) if no match is made in step (c) or step (d), then:
    (i) comparing in the computing device each primary element received in the step (b) to a list of prefixes and suffixes to determine if each primary element comprises a prefix or a suffix;
    (ii) determining in the computing device if each primary element for which a match was not made in step (i) of step (e) contains a compound-prefix;
    (iii) performing in the computing device a third analysis to determine if each primary element for which a match was not made in steps (i) and (ii) of step (e) contains a prefix, suffix or both;
    (iv) repeating steps (ii) and (iii) according to user preferences;
    (v) compiling in the computing device a list of primary elements containing compound-prefixes identified in step (ii);
    (vi) determining in the computing device the frequency of occurrence of each compound-prefix in the list of primary elements having compound-prefixes compiled in step (v);
    (vii) comparing in a computer system each compound-prefix associated with a primary element having a match made in step (ii) to each data unit to determine the frequency of occurrence of the compound-prefix in each data unit and storing the frequency of occurrence and the unit number associated with the data unit including the compound-prefix in memory;
    (viii) identifying in the computing device at least one unit number associated with each primary element having a compound-prefix or having a prefix, suffix or prefix/suffix combination, wherein the unit number is identified by removing the prefix, suffix or compound-prefix from the primary element and comparing the remaining sub-textual units of the primary element to secondary element to find a match, each secondary element being associated with a unit number; and
    (ix) compiling and prioritizing in the computing device a list of primary elements that include a compound-prefix or a prefix, suffix or prefix/suffix combination and a list of names that do not contain either of the above;
  f) selecting in the computing device a primary element;
  g) selecting in the computing device a unit number identified with the primary element;
  h) if there are any primary elements not selected, selecting in the computing device a primary element not previously selected and returning to step (f);
  i) initializing in the computing device at least one normalized database index;
  j) comparing in the computing device the data units associated with each of the unit numbers selected in step (g) with the normalized database index;
  k) outputting from the computing device the results of step (j) consisting of results selected from the group of results consisting of the primary element, at least one morphology of the primary element, and at least one variation of the primary element, where the variation includes a misspelling and a concatenation;
  l) if any primary element has a plurality of unit numbers identified with it proceeding to step (m), otherwise stopping;
  m) for each primary element having a plurality of unit numbers identified with it, and having at least one unit number not previously selected, selecting in the computing device a unit number not previously selected, otherwise selecting a unit number identified with each other primary element;
  n) comparing in the computing device the data units associated with each of the unit numbers selected in step (m) with at least one database index;
  o) outputting from the computing device the results of step (n) consisting of results selected from the group of results consisting of the primary element, at least one morphology of the primary element, and at least one variation of the primary element, where the variation includes a misspelling and a concatenation; and
  p) if any primary element has a unit number identified with it that has not been selected, returning to step (m), otherwise stopping.

* * * * *